2 Sheets--Sheet 1.

I. C. WALLACE & J. W. ANDREWS.
Car-Starters.

No. 146,112. Patented Dec. 30, 1873.

WITNESSES:
Jas. E. Hutchinson
John R. Young

INVENTOR.
I. C. Wallace and J. W. Andrews, by
Prindle and Deane, their Attys

2 Sheets--Sheet 2.

I. C. WALLACE & J. W. ANDREWS.
Car-Starters.

No. 146,112.    Patented Dec. 30, 1873.

WITNESSES:
Jas. E. Hutchinson
John R. Young

INVENTOR.
I. C. Wallace and J. W. Andrews, by
Prindle and Deane, their Attys

UNITED STATES PATENT OFFICE.

ISAAC C. WALLACE AND JOHN W. ANDREWS, OF DETROIT, MICHIGAN.

IMPROVEMENT IN CAR-STARTERS.

Specification forming part of Letters Patent No. 146,112, dated December 30, 1873; application filed November 4, 1873.

*To all whom it may concern:*

Be it known that we, ISAAC C. WALLACE and J. W. ANDREWS, of Detroit, in the county of Wayne and in the State of Michigan, have invented certain new and useful Improvements in Car-Starters; and do hereby declare that the following is a full, clear, and exact description thereof, reference being had to the accompanying drawings making a part of this specification, in which—

Figure 1:
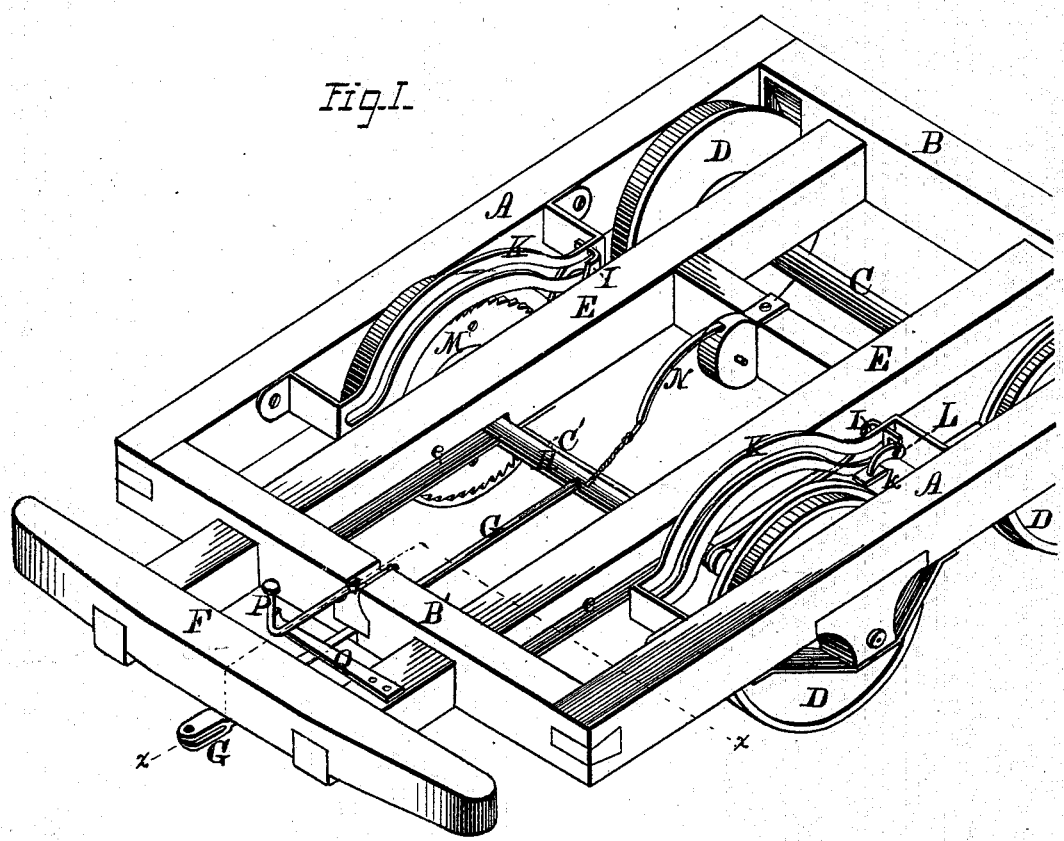
Figure 2:
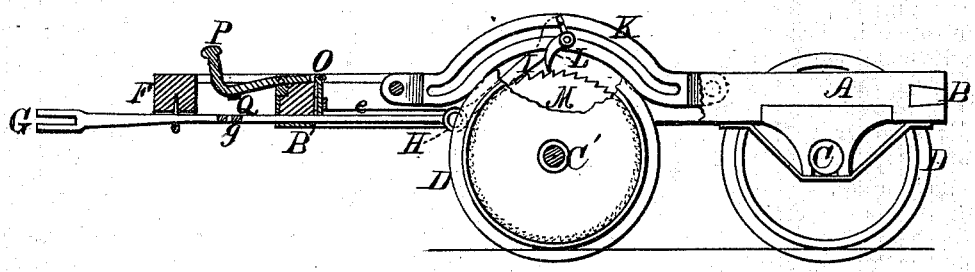

Figure 1 is a perspective view of a car-truck having attached thereto our improved apparatus; and Fig. 2 is a side elevation of the same, the side rail of the frame being broken away, and the forward portion of said frame removed upon line $x\ x$ of Fig. 1.

Letters of like name and kind refer to like parts in each of the figures.

The design of our invention is to enable the draft-animals of street-cars to start the same with greater ease than has heretofore been practicable; and it consists, principally, in combining with the draw-bar, and with a toothed ratchet-disk secured upon one or more of the car-wheels, a pivoted arm, having its rear end provided with a pawl, and caused to work within or upon a guide which coincides in shape and position to the circle of said ratchet-disk, whereby a horizontal movement of said draw-bar in a line with the draft shall cause said pawl to follow the line of the ratchet-teeth, substantially as and for the purpose hereinafter specified. It consists, further, in the means employed for removing the pawl from contact with the ratchet-wheel at the rear end of the stroke of the pivoted bar, substantially as and for the purpose hereinafter shown. It consists, finally, in the starting apparatus as a whole, when its several parts are constructed and combined to operate in the manner and for the purpose substantially as is hereinafter shown and described.

In the annexed drawings, A and A represent the side bars of a truck-frame, connected together at their ends by means of two cross-bars, B and B', and having journaled within suitable bearings attached to their lower sides two axles, C and C', each of which has near its ends two traction-wheels, D and D', all in the usual manner. Within the line of the wheels D and D', upon each side, is placed a bar, E, which is connected to and extends from the rear cross-bar B, forward beyond the front cross-bar B', and has its forward ends connected together by a bar, F, as shown. The draw-bar G is supported within suitable bearings attached to the lower sides and at the longitudinal centers of the bars F and B', and at its rear end is attached to or upon a bar, H, which latter extends laterally and horizontally outward in either direction to a point near the inner faces of the front wheels D', and has each of its ends contained within a horizontal longitudinal slot, $e$, that is formed within each bar E, the arrangement of parts being such as to enable said draw-bar G and cross-bar H to be drawn forward a distance slightly greater than the diameter of the traction-wheel. Upon each end of the bar H, between the frame-bar E and the inner faces of the wheels D and D', is pivoted one end of a rod or bar, I, which, from thence, extends rearward to a point in the rear of the forward wheel D', and from thence outward, and has its rear outward-projecting end loosely connected with a guide-bar, K, which latter extends upward, forward, and downward in a curve that coincides with the circle of said wheel, and at its ends is suitably connected to or with the truck-frame, by which arrangement of parts a forward movement of the draw-bar would cause the rear end of said pivoted bar or arm I to pass forward upon a line coincident to the upper side of the periphery of said wheel. A pawl, L, is pivoted upon the rear outer end of each arm I, and, extending forward and downward, engages with a toothed disk or ring, M, which is attached to or upon the inner face of each front wheel D', so that, as said arm is drawn forward by means of the draw-bar, said pawl will rotate said disk and its wheel in a like direction, and cause the car to move ahead, while upon the rearward motion of said parts, said pawl will pass over said toothed disk without engagement.

The relative proportions of the operative parts described are such as to cause the car to move forward about one-half the distance passed over by the draw-bar, by which means the power required to move said car is reduced one-half, and the draft-animals are enabled to start it, when heavily loaded, with greater ease than would be possible if said car was empty and a rigid connection made between the same and the double-tree.

The draw-bar G is returned to its rear position by means of a suitable spring, N, that is attached to or upon the frame, and connected, preferably, with a cross-bar, H, said spring having sufficient strength to retain said draw-bar in said position, except when the car is being started, at which time fully twice the power is necessarily expended that is required to keep the car in motion after its usual speed has been reached.

In order that, when the starting apparatus is not in use, the pawls may be removed from contact with the toothed disks, the rear end of each guide-bar K extends horizontally rearward for a short distance, and to its side, directly in a line, vertically, with said pawl, is secured a lug, $k$, that receives the latter and sustains it in vertical position, as shown in Fig. 1, after it has passed to the rear of said disk. This arrangement prevents the clicking noise that would otherwise be unavoidable, and also enables the draft-animals to obtain a slight headway before the car is started.

The draw-bar G is locked in place, when desired, by means of a bolt, O, which works vertically within suitable guides attached to or upon the rear side of the cross-bar B', and at its lower end fits into a corresponding opening, $g$, provided in the upper side of said draw-bar. A lever, P, pivoted upon the upper side of the cross-bar B', in a line with the draft, has its rear end connected with the upper end of the bolt O, and its forward end extended upward within convenient reach of the driver's foot, so that, by pressing said end downward, he can instantly release the draw-bar. A spring, Q, pressing upward against the forward end of the lever P, holds the bolt O in engagement with the draw-bar.

The apparatus described is simple in construction, easy of operation, not liable to get out of order, and, when applied to a car, adds but slightly to its cost, while, by its use, the wear of draft-animals is materially lessened, and the usual cause of balking avoided.

Having thus fully set forth the nature and merits of our invention, what we claim as new is—

1. In combination with the draw-bar G and the toothed disks M of the traction-wheels D', the pivoted arms I, arranged to work at their rear ends upon or within the curved guide-bar K, and provided with the pawls L, substantially as and for the purpose specified.

2. In combination with the pawls L, pivoted to or upon the arms I, and arranged to engage with the toothed disks M, the tripping-lugs $k$, substantially as and for the purpose shown.

3. The draw-bar G, cross-bar H, pivoted arms I, guide-bars K, pawls L, and toothed disks M, combined and applied to a car-truck in the manner and for the purpose substantially as set forth.

In testimony that we claim the foregoing we have hereunto set our hands this 31st day of October, 1873.

ISAAC C. WALLACE.
JOHN W. ANDREWS.

Witnesses:
JOHN T. LOVETT,
C. VONDERHEIDE.